United States Patent Office 3,442,654
Patented May 6, 1969

3,442,654
GELATIN COATING COMPOSITION CONTAINING PURIFIED POLYOXYALKYLENE GLYCOL ETHER
Fred S. Eiseman, Jr., Maplewood, and Leslie M. Schenck, Mountainside, N.J., and E. Scudder Mackey, Binghamton, N.Y., assignors to GAF Corporation, a corporation of Delaware
No Drawing. Filed Dec. 11, 1964, Ser. No. 417,786
Int. Cl. G03c 1/34; C09d 3/04; C07c 41/12
U.S. Cl. 96—109         21 Claims

ABSTRACT OF THE DISCLOSURE

A gelatino-silver halide coating composition having reduced fogging tendencies and the process for making the composition which involves incorporation therein, as a coating aid, of small proportions of a polyoxyalkylene glycol ether pretreated to reduce its fogging tendency by admixture with about 1 to 10 times its weight of water to form a homogeneous solution, heating to convert it into a two-phase system, and separating the organic phase from the aqueous phase.

---

This invention relates to gelatin coating compositions adapted for photographic purposes which compositions contain as a coating aid a small proportion of a water-soluble polyoxyalkylene glycol ether of reduced fogging tendencies wherein said polyoxyalkylene glycol ether of reduced fogging tendencies comprises the organic phase resulting from treating a polyoxyalkylene glycol ether with from about 1 to 10 parts by weight water per part by weight polyoxyalkylene glycol ether to form a homogeneous solution, heating said aqueous solution to a temperature sufficient to convert said solution into a two-phase system, one an organic phase and the other an aqueous phase, and separating said organic phase from said aqueous phase.

There are many instances in the production of photographic products where it is desirable to apply to a surface one or more coatings or layers of gelatin. For instance, in the making of photographic paper it is conventional to first apply to the paper a gelatin coating containing barium sulfate or some similar pigment. There may then be applied over this layer a photographic emulsion layer such as of a gelatino silver halide emulsion. Often an overcoating of aqueous gelatin is applied thereto. In commercial operations it is desirable that the coating be relatively uniform and that the coating operations be carried out at good production speeds.

When no coating aid is used, coating defects are evident; for example, the final product may show numerous crescent-shaped uncoated areas, i.e., repellency spots, about the size of a pin head with streaks running from the points of the crescent in a direction opposite to that of the coating. Often lighting coated areas of 5–10 mm. in diameter will appear.

When saponin, the conventional coating aid, is used in gelatin coating compositions, the layers obtained, when dried, are ordinarily a uniformly even coating, which can be rewet readily. Saponin, being a naturally occurring material of vegetable origin, may vary markedly from batch to batch both in quality and composition. This may adversely affect a photographic emulsion containing it or it may result in little or no improvement in coating properties in the composition to which it is added.

A number of synthetic materials have been suggested as coating aids in gelatin compositions, but these synthetic materials have been deficient in one way or another. For instance, a synthetic coating aid which may overcome water repellency satisfactorily and produce uniform coatings of photographic paper emulsions by a hopper technique, may result in surfaces that cannot be rewet readily, so that the product tends to form "air bells" on the emulsion surface during processing in commercial processing machines. These difficult to rewet areas where the "air bells" are formed manifest themselves as small underdeveloped or undeveloped areas in the processed product.

The ideal surface active agent for use in gelatin coating compositions (1) is a uniform material which does not vary from batch to batch, (2) enables coating machines to operate at peak rates of speed in both wet-on-wet and in wet-on-dry coatings, (3) does not impart streakiness or repellency to the gelatin, (4) is low in sludge and foam formation, (5) imparts minimum slippage to the applied coating, (6) is not photoactive and (7) eliminates the formation of "air bells."

It is well known that polyoxyalkylene ethers of alkyl phenols and aliphatic alcohols have surface active properties which could make them valuable gelatin coating composition additives. These surface active agents impart low-repellency during wet-on-wet and wet-on-dry coating, produce no processing sludge, do not contribute to air bell formation, and in general are desirable in all mechanical aspects of photographic film and paper manufacture. Unfortunately these materials are photoactive and promote fogging of gelatino silver halide emulsions. Until now this property has excluded their use in photographic gelatin coating compositions.

The object of this invention is to provide gelatin coating compositions adapted for photographic purposes having all the above desirable properties to a high degree. A further object of this invention is to provide gelatin coating compositions adapted for photographic purposes which compositions contain water-soluble polyoxyalkylene glycol ethers of reduced fogging tendencies.

We have now found that the objects of our invention can be attained by providing gelatin coating compositions comprising gelatin and a small concentration of a water-soluble polyoxyalkylene glycol ether wherein said polyoxyalkylene glycol ether comprises the organic phase resulting from treating the polyoxyalkylene glycol ether with from 1 to 10 parts by weight water per part by weight polyoxyalkylene glycol either to form a homogeneous solution, heating said aqueous solution to a temperature sufficient to convert said solution into a two-phase system, one an organic phase and the other an aqueous phase, and separating said organic phase from said aqueous phase. While it is not clear why the polyoxyalkylene glycol ether utilized in our invention has reduced fogging tendencies, it is apparently due to the fact that the fogging is caused by the presence of water-soluble impurities in the water-soluble polyoxyalkylene glycol ether. It is highly unexpected that these deleterious water-soluble impurities could be separated from the water-soluble polyoxyalkylene glycol ether in an aqueous extraction since the deleterious impurities and the polyoxyalkylene glycol ether are both water-soluble. Further, purification of polyoxyalkylene glycol ether is extremely difficult because of the high viscosity of the undiluted product.

The polyoxyalkylene glycol ethers useful in our invention are characterized by the structure

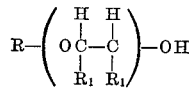

wherein R stands for a member of the group consisting of alkyl, alkenyl and aryl radicals containing at least 6 carbon atoms, $R_1$ stands for a number selected from the group consisting of hydrogen and lower alkyl, and $n$ is a number from 4 to 150.

These water-soluble polyoxyalkylene glycol ethers, as is well known in the surface active agent art, are prepared by the condensation of a water-insoluble monohydroxy organic compound having at least 6 carbon atoms such as hexyl alcohol, cyclohexyl alcohol, heptyl alcohol, 2-ethyl hexyl alcohol, decyl alcohol, lauryl alcohol, myristyl alcohol, palmityl alcohol, stearyl alcohol, oleyl alcohol, linoleyl alcohol, hexyl phenol, diisobutylphenol, n-octylphenol, t-octylphenol, nonylphenol, dodecylphenol, etc. with an alkylene oxide of 2 to 4 carbon atoms such as ethylene oxide, propylene oxide and butylene oxide. The prefererd surface active agents utilizable in our invention are the commercially available condensation products of alkylphenols with ethylene oxide, wherein the alkyl group of the alkylphenol contains from 8 to 12 carbon atoms.

In somewhat greater detail the polyoxyalkylene glycol ethers of reduced fogging tendencies utilized in our invention are prepared by treating the water-soluble polyoxyalkylene glycol ether, preferably a commercially available product, with from about 1 to 10 parts by weight water per part by weight polyoxyalkylene glycol ether. The particular degree of dilution which is desirable will vary with the particular compound to be treated and also, of course, with the viscosity of the solution. In order to obtain an aqueous polyoxyalkylene glycol ether of sufficiently low viscosity that it can be handled easily, it is desirable to dilute said polyoxyalkylene glycol ether with from about 1 to 6 parts by weight water per part by weight polyoxyalkylene glycol ether. However, to dilute a solution will not separate into separate phases on heating, or will require heating at relatively high temperature, so that a more dilute solution than that necessary to obtain the desired purification and sufficiently low viscosity should be avoided. After the polyoxyalkylene glycol ether is diluted with water it is heated to an elevated temperature and allowed to stand at such elevated temperature. Thereupon it will separate into two phases, one an organic phase and the other an aqueous phase. It has been found that the relative concentration of water-soluble polyoxyalkylene glycol ether in the organic phase, which separates on standing at an elevated temperature, increases as the temperature to which the dilute solution is heated increases. Therefore, the exact temperature to which the solution is heated may be varied somewhat, depending on the concentration desired in the organic phase. When the solution is heated to the boiling point of water at atmospheric pressure, it has been found that the organic phase, which separates on standing, will have a concentration of about 33 to 50%, depending on the particular solute. If a more highly concentrated organic phase is desired, higher temperature may be obtained by the use of pressure. Somewhat lower temperatures may be employed when a solution having a lower concentration than the organic phase obtainable at about 100° C. is desired. However, when a less concentrated solution is desired, it is preferable to heat the dilute solution to about 100° C. and permit it to stand and separate into two layers and remove therefrom so much of the aqueous phase as possible and upon cooling add back sufficient fresh water to form a solution of the desired concentration. Those skilled in the art can readily determine by a simple preliminary test the particular degree of separation which may be obtained at any given temperature, or conversely, the particular temperature necessary to affect any given degree of separation.

The temperature at which the organic phase can be separated from the aqueous phase can be reduced by adding a water-soluble inorganic salt to the aqueous polyoxylalkylene glycol ether. Only those salts which have no photoactivity can be utilized in this modification. The preferred salts for utilization herein are the halide salts of alkali metals, such as sodium chloride, potassium chloride, sodium bromide, sodium iodide, etc. It is usually desirable to utilize the salt of the same halide or halides to be used to prepare the light-sensitive silver halide emulsion. The non-photoactive water-soluble inorganic salt can comprise from about 1 to 20% by weight of the aqueous treating solution.

It will be understood that the aqueous phase after separation from the organic phase still contains an appreciable quantity of the polyoxyalkylene glycol ether. In order to avoid loss of this compound, it is preferable to employ the aqueous phase which is recovered from one concentration to dilute a subsequent charge. In this manner, substantially 100% recovery of the purified polyoxyalkylene glycol ether is feasible. However, it is usually advisable when using a recycle of this nature to employ a second or subsequent wash with fresh water and to discard subsequently a portion of the recycled water which is used in the first wash. Otherwise the treating liquor may become overloaded with fog promoting impurities and these may be carried over and not separated from the polyoxyalkylene glycol ether. Simple tests can be employed in order to determine when the aqueous phase should be discarded and when the polyoxylalkylene glycol ether in the organic phase is no longer undesirably photoactive.

The polyoxyalkylene glycol ether of this invention can comprise from about 0.01 to 10% by weight of the solids (dry weight) in the aqueous gelatin composition. Best results with aqueous gelatino silver halide emulsions have been obtained when the polyoxyalkylene glycol ether comprises from about 0.1 to 3% by weight of the solids in the light-sensitive emulsion. Best results with non-sensitive gelatin emulsions have been obtained when the polyoxyalkylene glycol ether comprises from about 0.1 to 5% by weight of the solids in the gelatin coating composition. The non-sensitive gelatin compositions are useful for forming anti-abrasion layers, non-curl layers, etc., where the proximity of the non-sensitive layers to the photosensitive silver halide emulsion can impart undesirable photoactivity.

The coating may be applied by any of the standard procedures employed in the photographic art. As an instance of such procedure paper base to be coated is passed through a trough or other reservoir whereby a gelatin coating is applied to the paper base. The coating is applied in greater thickness than desired and the surface is then subjected to the action of some leveling means such as a doctor blade or an air brush which causes run back of the coating composition and results in an even surface. In some cases the coating method may involve a hopper technique in which the thickness of the layer is regulated by the rate at which the coating composition is deposited upon the base which is moved along adjacent thereto.

As pointed out above, our invention comprises coating a support with a gelatin coating composition, either as an aqueous solution of gelatin or as a photographic emulsion which ordinarily is composed of an aqueous solution of gelatin containing as the light-sensitive material therein, a silver halide such as silver bromide, silver chloride, silver iodide, or their mixture. The light-sensitive emulsion may contain other added materials such as sensitizing dyes, hardeners, or the like. Descriptions of materials useful in photographic emulsions and their preparation are found in various places in the prior art such as in "Fundamentals of Photographic Theory" by James and Higgins; John Wiley and Sons, 1948.

The following examples are merely illustrative and should not be construed as limiting the scope of this invention. In the examples that follow, parts and percentages are by weight unless otherwise indicated.

Example I

Six hundred and twelve grams of Igepal CO–630 (Nonylphenol + 9 moles ethylene oxide) were mixed with twice its weight (1224 grams) of tap water to give a solution with a volume of 1780 ml. An equal volume of water (1780 ml.) was added and then heated to 90–95° C. with agitation. The agitation was stopped and the material was allowed to stand at 90–95° C. until it separated into two layers. The aqueous layer (containing a small amount of Igepal CO–630) was removed and replaced by a volume of fresh water equal to the volume removed. The wash was repeated three times and the final product; 1590 grams, was 66.7% $H_2O$ by Karl Fisher analysis. Yield of washed product was 86.5% by weight of the starting Igepal CO–630.

To one kilogram of gelatinous silver halide emulsion was added 2.5 ml. of a 10% solution of the polyoxyalkylene glycol ether obtained in the preceding paragraph. A second kilogram was formulated with 2.5 ml. of a 10% solution of Igepal CO–630 as commercially available. A third kilogram was formulated with Saponin, a well known and inert coating aid used in the trade. Each formulation was coated on conventional cellulose acetate film base and approximately 100 square feet of dried, coated material was obtained. This material was slit to usable dimensions and exposed with conventional sensitometric equipment so that the photoactivity of the coatings could be determined both for freshly coated material and for simulated aged material (which requires a 4 day oven conditioning at 120° F.). The test data readily showed that the polyoxyalkylene glycol ether prepared according to the method of our invention did not cause a chemical reduction of the silver halide as did the untreated material which caused 20% increase in fog density. This evidence was manifested as "fog" density on the sensitometric strip prepared from each coating. Actual density readings obtained from the conventional Macbeth-Ansco densitometer are as follows:

|  | Fog fresh density | Fog aged density |
| --- | --- | --- |
| Control | .26 | .48 |
| Untreated Igepal CO-630 emulsion | .31 | .52 |
| Treated Igepal CO-630 emulsion | .26 | .48 |

Example II

Three hundred grams of Igepal CA–730 (Diisobutyl phenol + 13 moles ethylene oxide) were mixed with twice its weight (600 grams) of a 10% by weight aqueous NaCl solution to give a solution with a volume of 800 ml. An equal volume (800 ml.) of 10% NaCl solution was added and the solution was heated to 75–80° C. with agitation. The agitation was stopped and the material allowed to stand at 75–80° C. until it separated into two layers (cloud point was 62°). The aqueous layer (containing a small amount of Igepal CA–730) was removed and replaced by a volume of fresh 10% NaCl solution equal to the volume removed. The wash was repeated three times and the residual water was then removed from the organic phase at about 100° C. by vacuum. The product was filtered to remove salt and the yield was 252 grams or 84.0% recovery.

Silver halide emulsions were prepared as in Example I except that untreated and treated Igepal CA–730 as described in the preceding paragraph were used in place of the corresponding Igepal CO–630.

Density readings obtained were as follows:

|  | Fog fresh density | Fog aged density |
| --- | --- | --- |
| Control | .25 | .47 |
| Untreated Igepal CA-730 emulsion | .31 | .51 |
| Treated Igepal CA-730 emulsion | .25 | .47 |

Example III

The extraction described in Example II was repeated with the condensation product of one mole decyl alcohol with eighteen moles ethylene oxide in place of the Igepal CA–730. Separations were made at 80–85° C. Yeld of dry filtered product was 240 grams or 80.0% recovery.

Silver halide emulsions were prepared as in Example I except that untreated and treated samples of decyl alcohol + 18 EO as described in the preceding paragraph were used in place of the Igepal CO–630.

Density readings obtained were as follows:

|  | Fog fresh density | Fog aged density |
| --- | --- | --- |
| Control | .27 | .49 |
| Untreated emulsion | .32 | .53 |
| Treated emulsion | .27 | .49 |

Variations and modifications can be made in the procedures, compositions and materials herein described without departing from the scope or spirit of this invention.

We claim:

1. A gelatin coating composition adapted for photographic purposes comprising gelatin and as a coating aid a small proportion of a water-soluble polyoxyalkylene glycol ether of reduced fogging tendencies having at least four oxyalkylene units wherein said polyoxyalkylene glycol ether of reduced fogging tendencies comprises the organic phase resulting from treating said polyoxyalkylene glycol ether with from about 1 to 10 parts by weight water per part by weight polyoxyalkylene glycol ether to form a homogeneous solution, heating said aqueous solution to a temperature sufficient to convert said solution into a two-phase system, one an organic phase and the other an aqueous phase, and separating said organic phase from said aqueous phase.

2. The composition of claim 1 wherein said polyoxyalkylene glycol ether comprises from about .01 to 10% by weight of the solids in said gelatin composition.

3. A gelatin coating composition adapted for photographic purposes comprising gelatin and as a coating aid a small proportion of a water-soluble polyoxyethylene glycol ether of reduced fogging tendencies having at least four oxyethylene units wherein said polyoxyethylene glycol ether of reduced fogging tendencies comprises the organic phase resulting from treating said polyoxyethylene glycol ether with from about 1 to 10 parts by weight water per part by weight polyoxyethylene glycol ether to form a homogeneous solution, heating said aqueous solution to a temperature sufficient to convert said solution into a two-phase system, one an organic phase and the other an aqueous phase, and separating said organic phase from said aqueous phase.

4. The composition of claim 3 wherein said polyoxyethylene glycol ether comprises the condensation product of an alkylphenol containing from 8 to 12 carbon atoms in the alkyl group with ethylene oxide.

5. The composition of claim 3 wherein said polyoxyethylene glycol ether comprises a nonylphenoxy polyoxyethylene glycol ether.

6. The composition of claim 3 wherein said polyoxyethylene glycol ether comprises an octylphenoxy polyoxyethylene glycol ether.

7. The composition of claim 3 wherein said polyoxyethylene glycol ether comprises a decyloxy polyoxyethylene glycol ether.

8. A gelatino silver halide coating composition adapted for photographic purposes which composition comprises gelatin, silver halide and as a coating aid a small proportion of a water-soluble polyoxyalkylene glycol ether of reduced fogging tendencies having at least four oxyalkylene units wherein said polyoxyalkylene glycol ether of reduced fogging tendencies comprises the organic phase resulting from treating said polyoxyalkylene glycol ether with from about 1 to 10 parts by weight water per part by weight polyoxyalkylene glycol ether to form a homogeneous solution, heating said solution to a temperature sufficient to convert said solution into a two-phase system, one an organic phase and the other an aqueous phase, and separating said organic phase from said aqueous phase.

9. The composition of claim 8 wherein said polyoxyalkylene glycol ether comprises from about .01 to 10% by weight of the solids in said gelatin composition.

10. A gelatino silver halide coating composition adapted for photographic purposes which composition comprises gelatin, silver halide and as a coating aid a small proportion of a water-soluble polyoxyethylene glycol ether of reduced fogging tendencies having at least four oxyethylene units wherein said polyoxyethylene glycol ether of reduced fogging tendencies comprises the organic phase resulting from treating said polyoxyethylene glycol ether with from about 1 to 10 parts by weight water per part by weight polyoxyethylene glycol ether to form a homogeneous solution, heating said solution to a temperature sufficient to convert said solution into a two-phase system, one an organic phase and the other an aqueous phase, and separating said organic phase from said aqueous phase.

11. The composition of claim 10 wherein said polyoxyethylene glycol ether comprises the condensation product of an alkylphenol containing from 8 to 12 carbon atoms in the alkyl group with ethylene oxide.

12. The composition of claim 10 wherein said polyoxyethylene glycol ether comprises a nonylphenoxy polyethylene glycol ether.

13. The composition of claim 10 wherein said polyoxyethylene glycol ether comprises an octylphenoxy polyoxyethylene glycol ether.

14. The composition of claim 10 wherein said polyoxyethylene glycol ether comprises a decyloxy polyoxyethylene glycol ether.

15. A process for preparing a photographic gelatino-silver halide emulsion of reduced fogging tendency which comprises:
(a) pretreating a water-soluble polyoxyalkylene glycol ether having at least 4 oxyalkylene units with a composition comprising from about 1 to 10 parts by weight of water per part by weight of polyoxyalkylene glycol ether to form a homogeneous solution;
(b) heating said solution to a temperature sufficient to convert said solution into a two-phase system;
(c) separating the organic phase from the aqueous phase and
(d) incorporating a small proportion of said organic phase as a coating aid in a photographic gelatino-silver halide emulsion.

16. The process of claim 15 wherein said polyoxyalkylene glycol ether constitutes from about 0.01 to 10% by weight of the solids in said gelatin composition.

17. The process of claim 15 wherein said polyoxyalkylene glycol ether is a polyoxyethylene glycol ether.

18. The process of claim 17 wherein said polyoxyethylene glycol ether comprises the condensation product of an alkyl phenol containing from 8 to 12 carbon atoms in the alkyl group with ethylene oxide.

19. The process of claim 17 wherein said polyoxyethylene glycol ether comprises a nonylphenoxy polyoxyethylene glycol ether.

20. The process of claim 17 wherein said polyoxyethylene glycol ether comprises an octylphenoxy polyoxyethylene glycol ether.

21. The process of claim 17 wherein said polyoxyethylene glycol ether comprises a decyloxy polyoxyethylene glycol ether.

References Cited

UNITED STATES PATENTS

| | | | |
|---|---|---|---|
| 2,496,582 | 2/1950 | Enyeart | 260—616 |
| 2,752,246 | 6/1956 | Weaver | 96—94 |

J. TRAVIS BROWN, *Primary Examiner.*

U.S. Cl. X.R.

96—94, 114; 106—125; 260—616